(12) United States Patent
Sun et al.

(10) Patent No.: US 11,354,433 B1
(45) Date of Patent: Jun. 7, 2022

(54) DYNAMIC TAINT TRACKING ON MOBILE DEVICES

(71) Applicant: Trend Micro Incorporated, Tokyo (JP)

(72) Inventors: Liang Sun, Nanjing (CN); Xingxing Sun, Nanjing (CN); Hua Ye, Nanjing (CN)

(73) Assignee: Trend Micro Incorporated, Tokyo (JP)

( * ) Notice: Subject to any disclaimer, the term of this patent is extended or adjusted under 35 U.S.C. 154(b) by 635 days.

(21) Appl. No.: 16/363,056

(22) Filed: Mar. 25, 2019

(51) Int. Cl.
  *G06F 7/04* (2006.01)
  *G06F 21/62* (2013.01)
  *G06F 8/41* (2018.01)

(52) U.S. Cl.
  CPC ............ *G06F 21/6245* (2013.01); *G06F 8/41* (2013.01); *G06F 8/441* (2013.01)

(58) Field of Classification Search
  CPC ......... G06F 8/41; G06F 8/441; G06F 21/6245
  USPC .................................. 717/127–133; 726/26
  See application file for complete search history.

(56) References Cited

U.S. PATENT DOCUMENTS

| | | | | |
|---|---|---|---|---|
| 8,423,965 B2 * | 4/2013 | Goel | ................... | G06F 11/3636 717/126 |
| 8,505,094 B1 * | 8/2013 | Xuewen | .............. | H04L 63/1416 726/22 |
| 8,776,026 B2 * | 7/2014 | Candea | ............... | G06F 11/3664 717/126 |
| 10,635,823 B2 * | 4/2020 | Gutson | ................... | G06F 21/54 |
| 2014/0113588 A1 | 4/2014 | Chekina et al. | | |
| 2015/0242635 A1 | 8/2015 | Li et al. | | |
| 2015/0356282 A1 | 12/2015 | Heen et al. | | |
| 2016/0012221 A1 | 1/2016 | Antonelli et al. | | |
| 2016/0042191 A1 | 2/2016 | Enck et al. | | |
| 2016/0154960 A1 | 6/2016 | Sharma et al. | | |
| 2017/0004303 A1 | 1/2017 | Yan et al. | | |
| 2017/0083705 A1 | 3/2017 | Lee et al. | | |
| 2017/0161176 A1 | 6/2017 | Ferrara et al. | | |
| 2017/0206355 A1 | 7/2017 | Nagumo et al. | | |
| 2017/0235945 A1 | 8/2017 | Lee et al. | | |
| 2017/0286644 A1 | 10/2017 | Dong et al. | | |
| 2018/0035285 A1 | 2/2018 | Ferrara et al. | | |
| 2018/0046798 A1 | 2/2018 | Zeller et al. | | |

OTHER PUBLICATIONS

Schutte et al., "AppCaulk: Data Leak Prevention by Injecting Targeted Taint Tracking Into Android Apps", 2014, IEEE, pp. 371-379. (Year: 2014).*

(Continued)

*Primary Examiner* — Ted T. Vo

(74) *Attorney, Agent, or Firm* — Beyer Law Group LLP

(57) ABSTRACT

Taint is dynamically tracked on a mobile device. Taint virtual instructions are added to virtual instructions of a control-flow graph (CFG). A taint virtual instruction has a taint operand that corresponds to an operand of a virtual instruction and has a taint output that corresponds to an output of the virtual instruction in a block of the CFG. Registers are allocated for the taint virtual instruction and the virtual instructions. After register allocation, the taint virtual instruction and the virtual instructions are converted to native code, which is executed to track taint on the mobile device.

20 Claims, 6 Drawing Sheets

(56) References Cited

OTHER PUBLICATIONS

Backes et al., "POSTER: Towards Compiler-Assisted Taint Tracking on the Android Runtime (ART)", 2015, ACM, pp. 1629-1631. (Year: 2015).*

Graa et al., "Tracking Explicit and Control Flows in Java and Native Android Apps Code", 2016, In Proceedings of the 2nd International Conference on Information Systems Security and Privacy, pp. 307-316. (Year: 2016).*

William Enck, et al. "TaintDroid: An Information-Flow Tracking System for Realtime Privacy Monitoring on Smartphones", Oct. 2010, 15 sheets, OSDI'10 Proceedings of the 9th USENIX conference on Operating systems Design and Implementation.

Mingshen Sun, et al."TaintArt: A Practical Multi-level Information-Flow Tracking System for Android RunTime", Oct. 2016, 12 sheets, CCS'16 Proceedings of the 2016 ACM SIGSAC Conference on Computer and Communications Security.

* cited by examiner

DYNAMIC TAINT TRACKING ON MOBILE DEVICES

COPYRIGHT NOTICE

A portion of the disclosure of this patent document contains material to which a claim for copyright is made. The copyright owner has no objection to the facsimile reproduction by anyone of the patent document or the patent disclosure, as it appears in the United States Patent and Trademark Office patent file or records, but reserves all other copyright rights whatsoever.

BACKGROUND OF THE INVENTION

1. Field of the Invention

The present invention relates generally to mobile device security, and more particularly but not exclusively to dynamic taint tracking.

2. Description of the Background Art

Mobile devices, such as smartphones and tablets, have become commonplace and are now employed not just to make voice calls over traditional mobile telephone networks, but also to browse the Internet, watch streamed video, and play online games. The number of mobile apps for mobile operating systems is growing each day.

Despite their increasing sophistication, mobile devices remain resource-constrained relative to laptop and desktop computers. Accordingly, mobile devices run mobile operating systems, such as the ANDROID and the iOS operating systems. An application program suitable for a mobile operating system is referred to as a "mobile app" or simply as an "app." Apps may be obtained from an app store, such as the GOOGLE PLAY app store and AMAZON app store for ANDROID-based mobile devices and the APPLE app store for iOS-based mobile devices.

Governmental requirements and general privacy concerns have prompted evaluation of mobile devices for leakage of sensitive data. More particularly, there is a need to evaluate apps for conformance with privacy policies, such as whether apps misuse sensitive data. Examples of such misuse include transmitting location information, contacts information, etc., out of the mobile device in violation of a privacy policy.

SUMMARY

In one embodiment, taint virtual instructions are added to virtual instructions of a control-flow graph (CFG). A taint virtual instruction has a taint operand that corresponds to an operand of a virtual instruction and has a taint output that corresponds to an output of the virtual instruction in a block of the CFG. Registers are allocated for the taint virtual instruction and the virtual instructions. After register allocation, the taint virtual instruction and the virtual instructions are converted to native code, which is executed to track taint on the mobile device.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
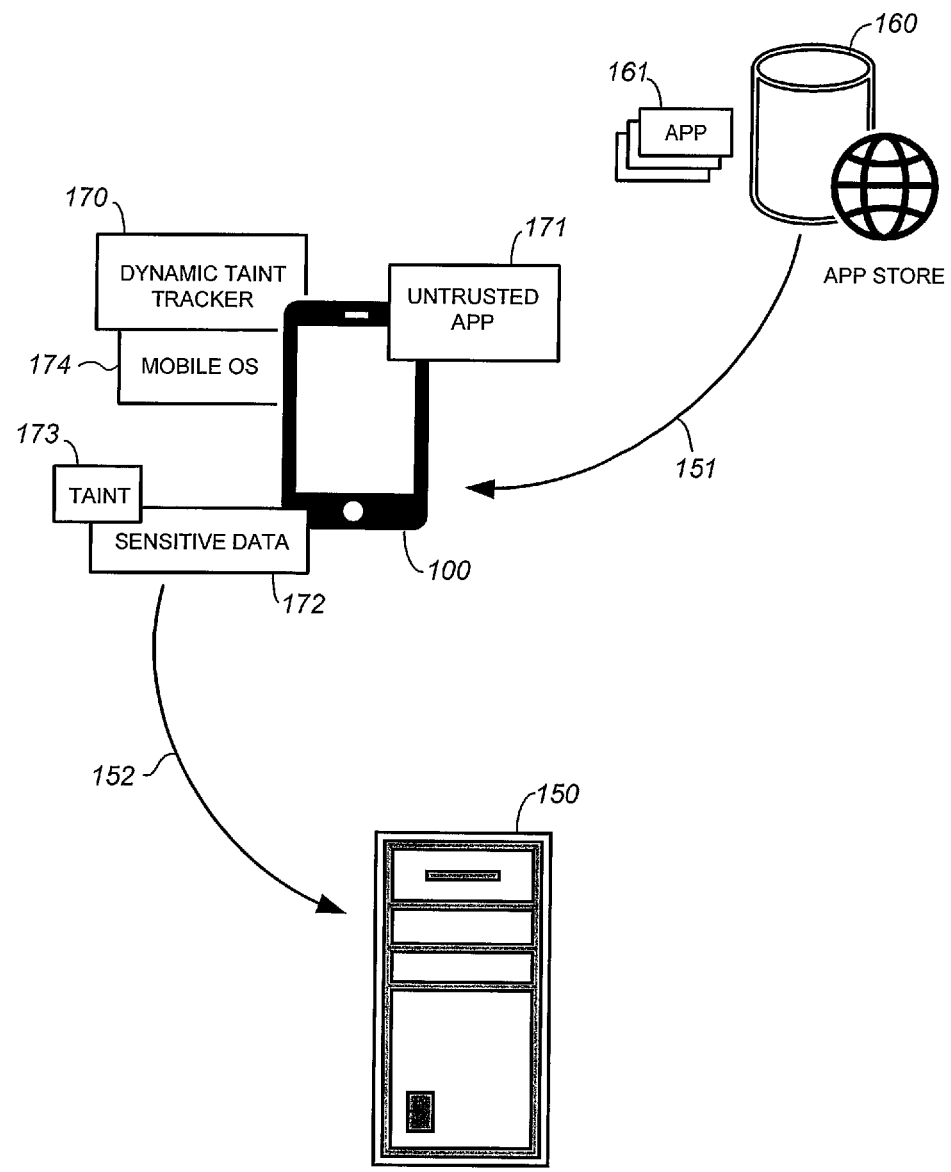
FIG. 1 shows a flow diagram of an operation of a mobile device in accordance with an embodiment of the present invention.

FIG. 1 shows a flow diagram of an operation of a mobile device 100 in accordance with an embodiment of the present invention. The mobile device 100 may be a smartphone, a tablet, or other mobile device that runs a mobile operating system. Generally speaking, a mobile operating system is lightweight in that it consumes less computing resources, such as processor and memory resources, compared to a laptop or desktop operating system. In the case of a smartphone or a tablet with suitable connectivity, a mobile operating system may also support communications over a mobile phone network, such as a cellular network, to provide telephony functionality. The mobile device 100 may run a mobile operating system 174, which is the ANDROID mobile operating system, e.g. version 7.0 "Nougat", in the example of FIG. 1. As can be appreciated, embodiments of the present invention are applicable to other suitable mobile operating systems.

Apps 161 may be received from a variety of sources including from an app store 160, which in the example of FIG. 1 is the GOOGLE PLAY app store. In the example of FIG. 1, an untrusted app 171 is an app 161 received by the mobile device 100 from the app store 160 (see arrow 151). The app 171 is "untrusted" in that it has not been evaluated for conformance with privacy policies.

There is a concern that the untrusted app 171 may violate one or more privacy policies. More particularly, the mobile device 100 may store a plurality of sensitive data, such as location information of the mobile device 100, contacts records, accelerometer values, short test messages (SMS), and so on. The untrusted app 171 may access and leak sensitive data by transmitting the sensitive data out of the mobile device 100 and onto an external computer 150 (see arrow 152) in violation of a privacy policy. The privacy policy may be based on governmental requirements, such as the European Union (EU) General Data Protection Regulation (GDPR) and the United States Children's Online Privacy Protection Rule (COPPA). The privacy policy may also be based on preference of the user of the mobile device 100 or other privacy requirements.

In the context of computer security, labeling or marking data for tracking purposes is referred to as "tainting." In the present disclosure, "taint" is a label or marker applied to sensitive data for purposes of tracking the sensitive data. Dynamic taint analysis refers to tracking the propagation of taint during runtime. Because of resource constraints, dynamic taint analysis solutions that are employed for laptop and desktop computers are not readily applicable to mobile devices.

In legacy ANDROID mobile operating systems, apps are executed in a Dalvik virtual machine runtime environment, which interprets opcode at runtime according to a just-in-time (JIT) compilation strategy. Generally speaking, just-in-time compilation strategy makes dynamic taint analysis relatively easy. In newer ANDROID mobile operating systems, the Dalvik virtual machine runtime environment has been replaced with the ANDROID RunTime (ART) environment, which uses an ahead-of-time (AOT) compilation strategy. In ahead-of-time compilation strategy, apps are compiled during the installation stage, which makes it difficult to dynamically track taint at runtime.

In the example of FIG. 1, the mobile device 100 includes a dynamic taint tracker 170. In one embodiment, the taint tracker 170 comprises instructions that when executed by the processor of the mobile device 100 cause the mobile device 100 to dynamically track taint on the mobile device 100. In one embodiment, the mobile device 100, as configured with the dynamic taint tracker 170, is configured to translate a Dalvik opcode of an app into a control-flow graph (CFG), optimize the CFG, add taint virtual instructions to corresponding virtual instructions of the optimized CFG, allocate registers for the taint virtual instructions and virtual instructions, convert the taint virtual instructions and virtual instructions to native code, and execute the native code. The taint virtual instructions may be added in an optimized CFG of the untrusted app 171, libraries, system services, and other software modules of the mobile device 100. The operation of the dynamic taint tracker 170 is further explained below with reference to FIGS. 2-5.

The mobile device 100 may track the propagation of a taint 173 as the taint 173 propagates through the untrusted app 171 and other components of the mobile device 100. This advantageously allows the mobile device 100 to detect when the taint 173, and thus a sensitive data 172 marked with the taint 173, is being leaked out of the mobile device 100. A component where a taint is forwarded or stored for leaking out of the mobile device 100 is also referred to as a "taint sink." The taint sink may be a network communications output of the mobile device 100. The mobile device 100 as configured with the dynamic taint tracker 170 may monitor taint sinks for presence of the taint 173 to detect data leak.

Figure 2:
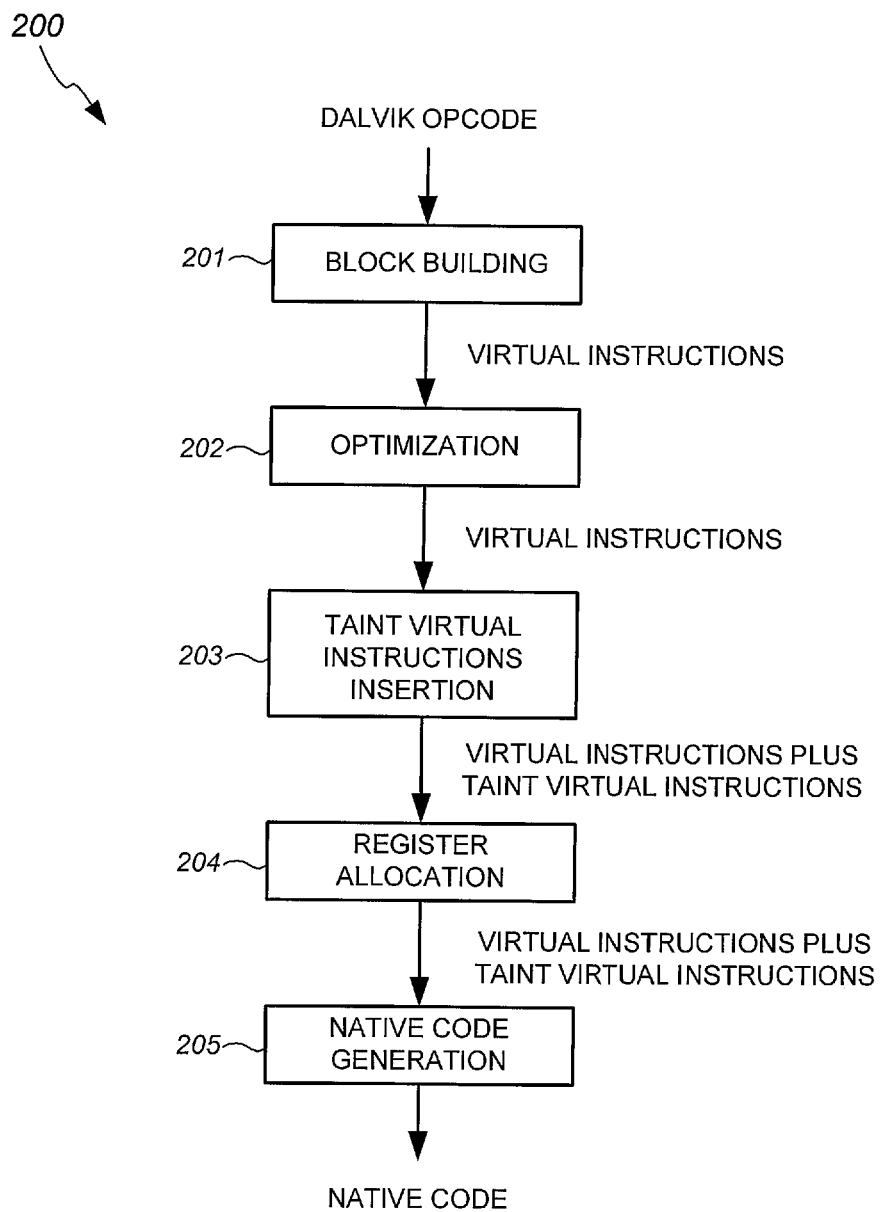
FIG. 2 shows a flow diagram of a method of compiling opcode to native code for dynamic taint analysis in accordance with an embodiment of the present invention.

FIG. 2 shows a flow diagram of a method 200 of compiling opcode to native code for dynamic taint analysis in accordance with an embodiment of the present invention. The method of FIG. 2 is explained in the context of the ART environment. As can be appreciated, the method of FIG. 2 is also applicable to other similar runtime environments.

In the example of FIG. 2, the method 200 compiles Dalvik opcode of an app to native code, which is executed by the ART environment. In the example of FIG. 2, a block building step 201 translates the opcode into a control-flow graph (CFG) that comprises virtual instructions, which are also referred to as "intermediate representations" (IR). More particularly, during the block building step 201, the Dalvik opcode is translated into an HGraph, which is a CFG of a method and contains a list of HBasicBlocks. An HBasicBlock is a block in a method and contains a list of HInstructions (i.e., virtual instructions) that are represented as a double linked list.

The output of the block building step 201 is a CFG comprising a first set of virtual instructions. The block building step 201 is followed by an optimization step 202, which optimizes the CFG to improve runtime performance. The output of the optimization step 202 is an optimized CFG comprising a second set of virtual instructions. The first and second set of virtual instructions may be different, e.g., when virtual instructions in the first set are removed during optimization and are thus not included in the second set.

In a traditional compilation process, the optimization step 202 is immediately followed by a register allocation step 204 whereby registers needed by the app at runtime are allocated. The register allocation step 204 is followed by a native code generation step 205 whereby the virtual instructions of the optimized CFG are converted to native code suitable for execution by the runtime environment.

In the example of FIG. 2, to allow for dynamic taint tracking, taint virtual instructions are inserted in the CFG after the optimization step 202 but before the register allocation step 204. More particularly, after the optimization step 202, taint virtual instructions for dynamic taint tracking are added to the optimized CFG. In one embodiment, the taint virtual instructions receive taints as operands and are added for corresponding virtual instructions in the same block. The code logic of the taint virtual instructions simply pass and store taints, and accordingly does not modify the original code logic of the CFG. This allows for a minimum of changes to the optimized CFG (which can get very complicated), and allows for dynamic taint tracking without requiring allocation of particular registers just for taint tracking purposes.

In the example of FIG. 2, the output of the taint virtual instructions insertion step 203 is the optimized CFG comprising virtual instructions plus the added taint virtual instructions. In the register allocation step 204, registers are allocated for the optimized CFG comprising the virtual instructions plus the added taint virtual instructions. In the native code generation step 205, the virtual instructions plus the added taint virtual instructions of the optimized CFG are converted to native code for execution by the runtime environment.

As can be appreciated, the block building step 201, optimization step 202, register allocation step 204, and native code generation step 205 may be implemented as in the ART compiler. Accordingly, embodiments of the present invention may be implemented by performing suitable modifications to the ART compiler to accommodate the added taint virtual instructions as disclosed herein.

Figure 3:
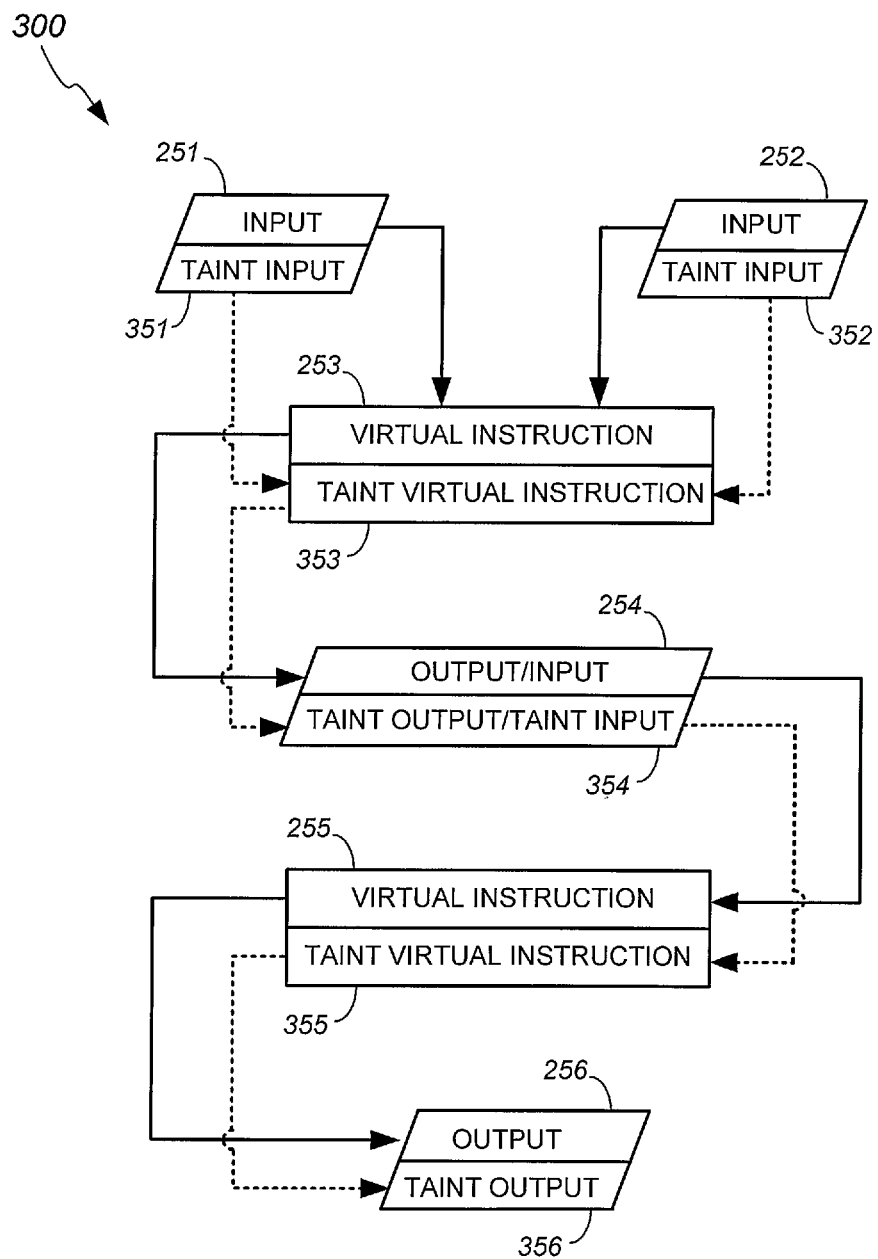
FIG. 3 shows a control-flow-graph (CFG) with added taint virtual instructions for dynamic taint tracking in accordance with an embodiment of the present invention.

FIG. 3 shows a control-flow-graph (CFG) 300 with added taint virtual instructions for dynamic taint tracking in accordance with an embodiment of the present invention.

The example of FIG. 3 shows a single block of an optimized CFG 300 for purposes of illustration. The CFG 300 includes a virtual instruction 253 that receives an input 251 and an input 252 as operands. The output of the virtual instruction 253 is the input of a virtual instruction 255 (see output/input 254). The virtual instruction 255 uses the output of the virtual instruction 253 as an operand. The output 256 of the virtual instruction 255 may be the input of another virtual instruction, and so on. In the example of FIG. 3, the virtual instructions 253 and 255 are original virtual instructions, i.e., part of the optimized CFG of the app before addition of taint virtual instructions 353 and 355.

In the example of FIG. 3, the taint virtual instructions 353 and 355 are added to the CFG 300 after the optimization step, for the purpose of dynamically tracking taint propagation through the app. That is, the taint virtual instructions 353 and 355 are not from the opcode of the app. In one embodiment a taint virtual instruction is added in the CFG of a block for a virtual instruction in the block that has operands and propagates data. For example, a virtual instruction for jump (e.g., "HGoto") does not necessarily need a taint virtual instruction added for it.

A taint virtual instruction may be added just before or just after a corresponding virtual instruction. In the example of FIG. 3, the taint virtual instruction 353 is added for the corresponding virtual instruction 253. The taint virtual instruction 353 receives a taint input 351 and a taint input 352 as operands to correspond to the inputs 251 and 252 of the virtual instruction 253. This allows the taint virtual instruction 353 to operate on operands independent of the virtual instruction 253.

In one embodiment, when a first virtual instruction with a corresponding first taint virtual instruction outputs to a second virtual instruction, a second taint virtual instruction is added to receive the output of the first taint virtual instruction. In the example of FIG. 3, the output of the taint virtual instruction 353 is an input of the virtual instruction 355 (see taint output/taint input 354). The taint virtual instruction 355 uses the output of the taint virtual instruction 353 as an operand. The taint output 356 of the taint virtual instruction 355 may be the taint input of another taint virtual instruction if the output 256 of the virtual instruction 255 propagates to another virtual instruction, and so on. Similarly, the inputs 251 and 252 may be outputs of one or more virtual instructions (not shown) and the taint inputs 351 and 352 may be outputs of one or more taint virtual instructions (not shown).

A taint input of a taint virtual instruction may receive a taint when an input of a corresponding virtual instruction is configured to receive data marked with the taint. That is, when tainted data is received by the app at runtime, the code logic of the taint virtual instructions receive the taint. A taint virtual instruction may store an operand as an output. A variable or other storage location assigned to receiving the output of the taint virtual instruction may be read to check if the taint has propagated through the block.

In the example of FIG. 3, the virtual instruction 253, virtual instruction 255, taint virtual instruction 353, and taint virtual instruction 355 are in the same block of the CFG. The operation of the virtual instructions 253 and 255 on received operands is mirrored by the taint virtual instructions 353 and 355. Because the taint virtual instructions 353 and 355 are separate from the virtual instructions 253 and 255, the taint virtual instructions 353 and 355 can pass taints that are received as operands independent from the virtual instructions 253 and 255.

In one embodiment, a taint may be assigned a single bit in a 32-bit word to identify different sensitive data. For example, taints may be defined as shown in Table 1 below:

TABLE 1

```
#define TAINT_CLEAR         ((u4)0x00000000) /* No taint */
#define TAINT_LOCATION      ((u4)0x00000001) /* Location */
#define TAINT_CONTACTS      ((u4)0x00000002) /* Address Book
(ContactsProvider) */
#define TAINT_MIC           ((u4)0x00000004) /* Microphone Input */
#define TAINT_PHONE_NUMBER  ((u4)0x00000008) /* Phone Number */
#define TAINT_LOCATION_GPS  ((u4)0x00000010) /* GPS Location */
#define TAINT_LOCATION_NET  ((u4)0x00000020) /* NET-based Location */
#define TAINT_LOCATION_LAST ((u4)0x00000040) /* Last known Location */
#define TAINT_CAMERA        ((u4)0x00000080) /* camera */
#define TAINT_ACCELEROMETER ((u4)0x00000100) /* accelerometer */
#define TAINT_SMS           ((u4)0x00000200) /* SMS */
:
:
```

As a particular example, the virtual instruction 253 may be an ADD instruction that receives inputs 251 and 252 as operands, and outputs the sum of the operands as output/input 254. In that example, the taint virtual instruction 353 may be a pre-defined OR instruction that has been designated to be added to the CFG for an ADD instruction that receives two operands. Assuming the TAINT_LOCATION identifying a taint for the location information of the mobile deice 100 is present at the input 251 or input 252, the virtual instruction 253 would perform an ADD operation on the taint, and possibly change it. On the other hand, the taint virtual instruction 353 would simply OR the taint inputs 351 and 352, thereby effectively passing the TAINT_LOCATION through and allowing for its detection and tracking. And because the taint virtual instruction 353 is inserted in the optimized CFG prior to the register allocation step and native code generation step (see FIG. 2, step 203), the taint virtual instruction 353 will be seamlessly added to the app, thereby allowing for dynamic taint tracking at runtime of the app.

An example of an original opcode that will be modified for taint tracking is shown in Table 2 below.

TABLE 2

```
public class calculator {
    private static int height=5;
    public int sum(int width, int length){
        int temp = width * length ;
        int result = temp * height;
        return result;
    }
}
```

In the example of Table 2, the code block of the function "calculator" receives variables "width" and "length" as inputs, performs a multiply operation on "width" and "length", and outputs a variable "result" equal to the multiplication of "width", "length", and "height." An example code logic of a taint virtual instruction inserted in the code block of Table 2 is shown in Table 3 below.

TABLE 3

```
public class calculator {
  int height = 5;
  int height_taint = taint; //The taint can be set with an API if we want to track height.
public Jvalue sum(int width, int length, int width_taint, int length_taint){
    int temp = width * length ;
    int temp_taint = width_taint | taint_length;
    int result = temp * height;
    int result_taint = temp_taint | height_taint;
    Jvalue delegate_result;
    delegate_result.SetI(result);
    delegate_result.SetTaint(result_taint);
    return delegate_result;
  }
}
```

The example of Table 3 is in original code format, instead of virtual instruction format, to facilitate understanding of an example code logic of an added taint virtual instruction. As can be appreciated, in practice, Table 3 will be in virtual instruction format, i.e., intermediate representation. In the example of Table 3, the taint virtual instruction receives taint from the variables "width_taint" and "length_taint", which correspond to the variables "width" and "length" of the virtual instruction. Whereas the original code logic of the virtual instruction performs a multiply operation on the variables "width" and "length", the code logic of the taint virtual instruction performs an OR operation on the taint variables (compare "temp" to "temp_taint" in Table 3). The output of the code block is set to "delegate_result" (an object of "Jvalue" type) so as to pass the taint through the code block. "delegate_result" may be read to check for the taint.

In the example of Table 3, the function stack frame is extended to pass taint (width_taint and length_taint) parameter and to allocate additional members for storing the taint (height_taint) member variable for object during compilation. Also, taint (temp_taint) representing temp variable in the function will be allocated during compilation. In the example of Table 3, the function return value is wrapped by Jvalue (delegate_result), and a taint member is added at the end of Jvalue. This way, the format of the return value is not changed and taint values are appended to the end of Jvalue. An example data structure for Jvalue is shown in Table 4 below.

TABLE 4

```
struct PACKED(4) JValue {
  // We default initialize JValue instances to all-zeros.
  JValue( ) : taint(0) { }
  int8_t GetB( ) const { return value.b; }
  void SetB(int8_t new_b) {
    value.j = ((static_cast<int64_t>(new_b) << 56) >> 56); // Sign-extend to 64 bits.}
  uint16_t GetC( ) const { return value.c; }
  void SetC(uint16_t new_c) { value.c = new_c; }
  :
  :
  uint32_t GetTaint( ) const { return taint; }
  void SetTaint(uint32 _t new_taint) { taint = new_taint; }
  private:
  union PACKED(4) Value {
    Value( ) : j(0) { }
    uint8_t z;
    int8_t b;
    uint16_t c;
    int16_t s;
    int32_t i;
    int64_t j;
```

TABLE 4-continued

```
    float f;
    double d;
    mirror::Object* I;
  } value;
  uint32_t taint;
};
} // namespace art
```

Figure 4:
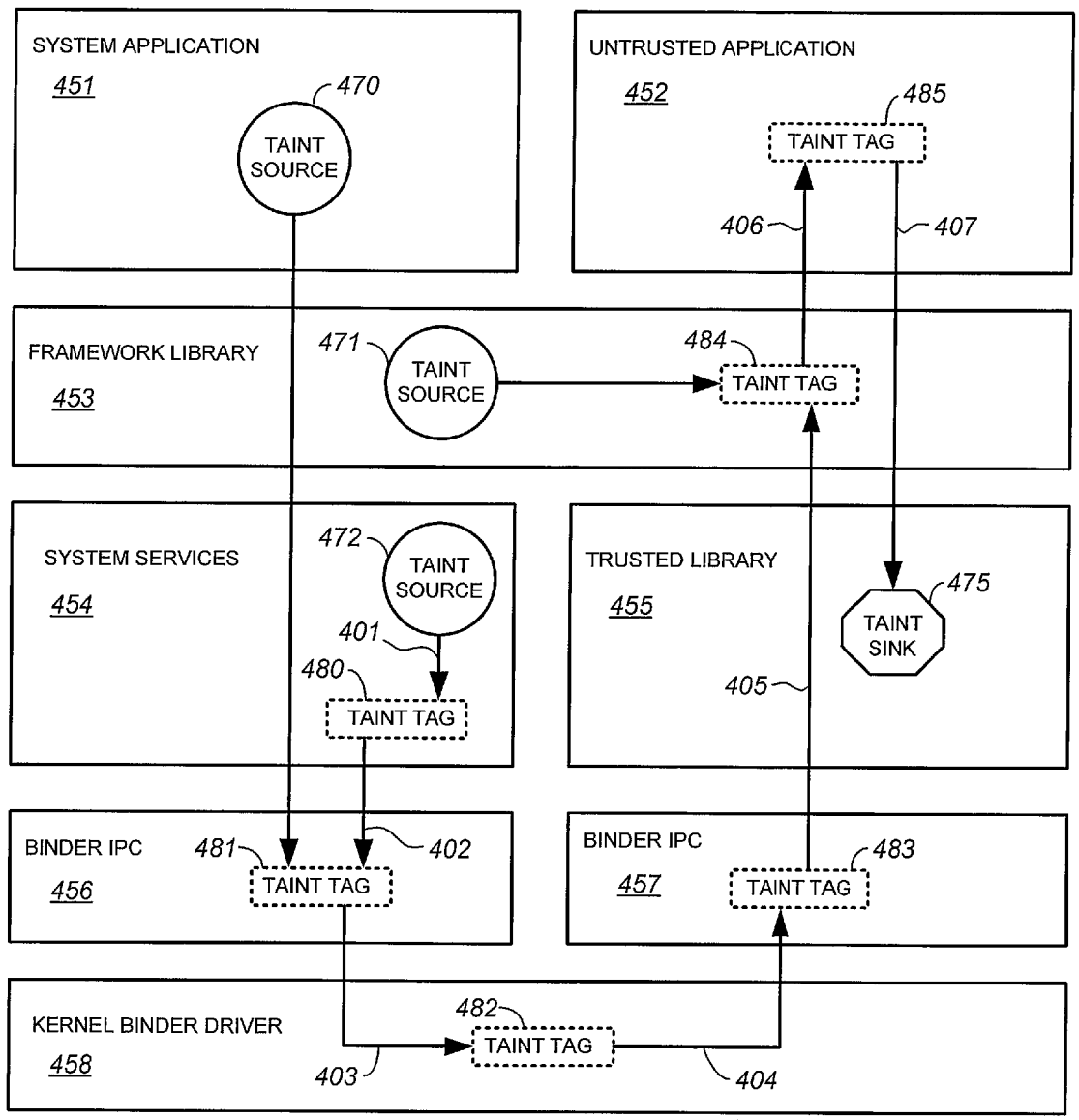
FIG. 4 shows a flow diagram of a dynamic taint tracking operation on a mobile device in accordance with an embodiment of the present invention.

FIG. 4 shows a flow diagram of a dynamic taint tracking operation on a mobile device in accordance with an embodiment of the present invention. The example of FIG. 4 is for an ANDROID mobile operating system with the ART environment.

Taint virtual instructions may be added in untrusted apps, as well as in system services and libraries. Generally speaking, taint virtual instructions may be added in software modules that serve as a "taint tag", i.e., where presence of taint is to be tracked. A "taint source" comprises data that is marked with a taint.

In the example of FIG. 4, taint virtual instructions are added in an untrusted app 452, library 453, system service 454, binder interprocess communication (IPC) 456, binder IPC 457, and kernel binder driver 458. This results in taint tags 480-485 for tracking propagation of taints on the mobile device 100. Sensitive data from the system app 451, framework library 453, and system service 454 may be marked with a taint to provide taint sources 470-472. Taint from the system app 451, framework library 453, and system service 454 may be tracked through the taint tags 481-485 and also at a taint sink 475.

In an example operation, the taint source 472 may comprise location data that has been marked with the taint "TAINT_LOCATION:0x00000001". The location data may indicate the global positioning system (GPS) coordinates of the mobile device 100, which is output by a location manager system service 454 (see arrow 401). The tainted location data will be detected at the taint tag 480. The untrusted app 452 may call the system service 454 to get the last known location of the mobile device 100. The untrusted app 452 will get the tainted location data (see arrow 406) through the binder IPC 456 (see arrow 402), the kernel binder driver 458 (see arrow 403), the binder IPC 457 (see arrow 404), and the framework library 453 (see arrow 405). Along the way, the taint is detected at taint tags 480-485. The untrusted app 452 and/or other modules traversed by the tainted location data may encode or modify (e.g., splice data to) the tainted location data to avoid detection. However, the taint on the location data is still tracked as propagating through the taint tags 480-485, and is detected to have been received and sent out by the untrusted app 452. The untrusted app 452 may attempt to transmit (see arrow 407) the tainted location data out of the mobile device 100 by way of the taint sink 475, e.g., by HTTP/HTTPS/SOCKET/SMS. The taint may be detected at the taint sink 475.

Dynamic taint tracking is often performed in test environments, such as when evaluating untrusted apps for compliance with privacy policies. A mobile device in a test environment may first be checked to make sure that no data leak occurs. Then, one untrusted app at a time may be installed and executed with dynamic taint tracking on the mobile device. This way, any data leak detected at a taint sink may be readily attributed to the untrusted app. The untrusted app responsible for the data leak at the taint sink may also be identified by its process identifier (ID).

Figure 5:
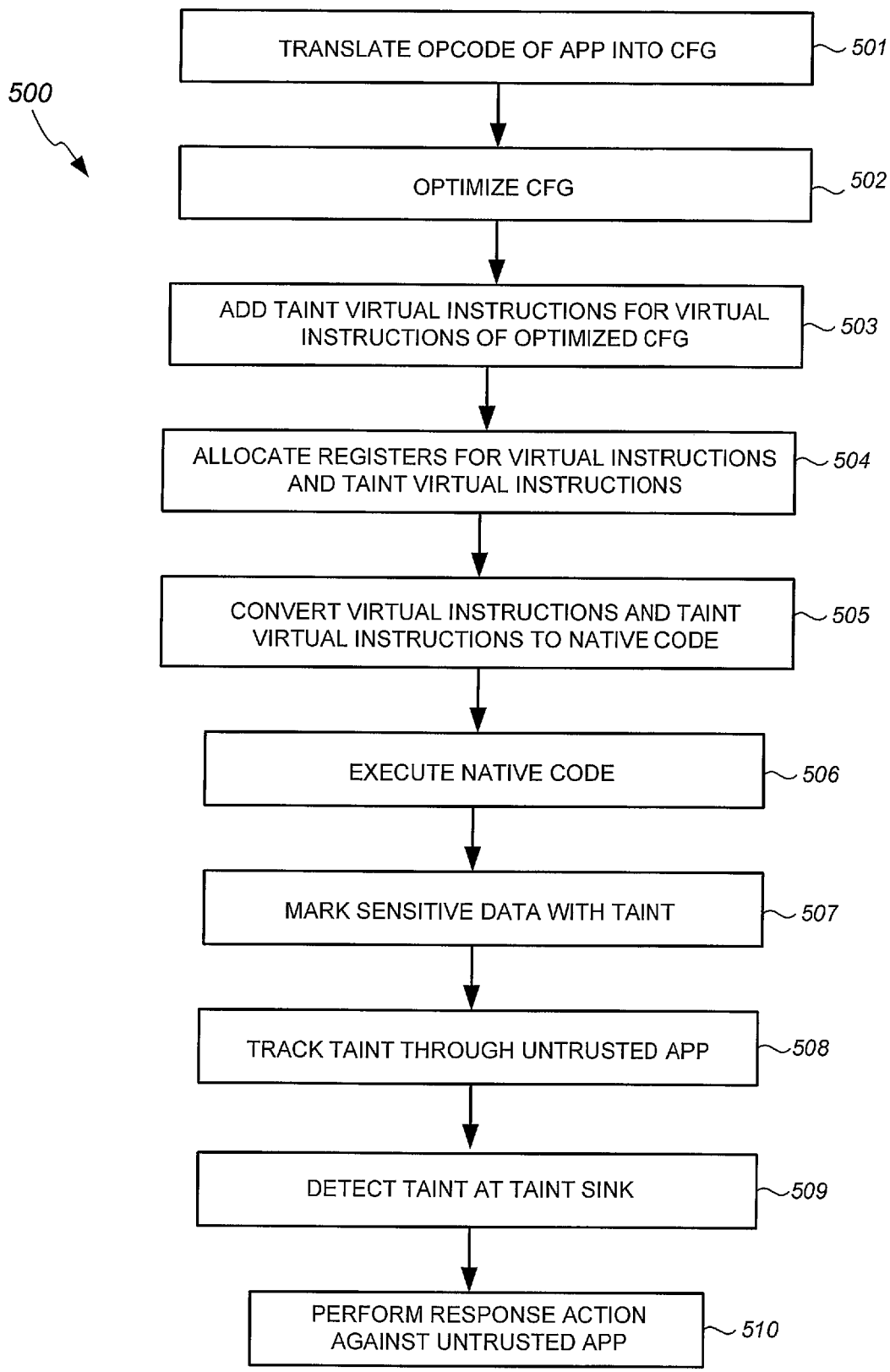
FIG. 5 show a flow diagram of a method of dynamically tracking taint on a mobile device in accordance with an embodiment of the present invention.

FIG. 5 shows a flow diagram of a method 500 of dynamically tracking taint on a mobile device in accordance with an embodiment of the present invention. The method 500 may be performed by the mobile device 100 as configured with the dynamic taint tracker 170.

In the example of FIG. 5, a Dalvik opcode of an untrusted app is translated to a CFG (step 501), which is thereafter optimized (step 502). Taint virtual instructions are added for virtual instructions in the same block of an optimized CFG (step 503). Each of the taint virtual instructions may have a taint operand that corresponds to an operand of a corresponding virtual instruction and a taint output that corresponds to an output of the corresponding virtual instruction. After addition of the taint virtual instructions, registers are allocated for the virtual instructions and taint virtual instructions (step 504). That is, the taint virtual instructions are added after the optimization step of the compilation process, but before the register allocation step. After the register allocation step, the virtual instructions and taint virtual instructions are converted to native code (step 505).

The native code is executed to evaluate the untrusted app for data leakage (step 506). A sensitive data is marked with taint (step 507), and the taint is tracked through the untrusted app and other software modules that have taint virtual instructions (step 508). The untrusted app is deemed to be leaking data in violation of a privacy policy when the taint is detected at a taint sink (step 509). In response to detecting the taint at the taint sink, a response action is performed against the untrusted app (step 510). The response action may include preventing execution of the untrusted app on a mobile device, such as preventing installation of the untrusted app on other mobile devices, blocking availability of the untrusted app in app stores, etc.

Figure 6:
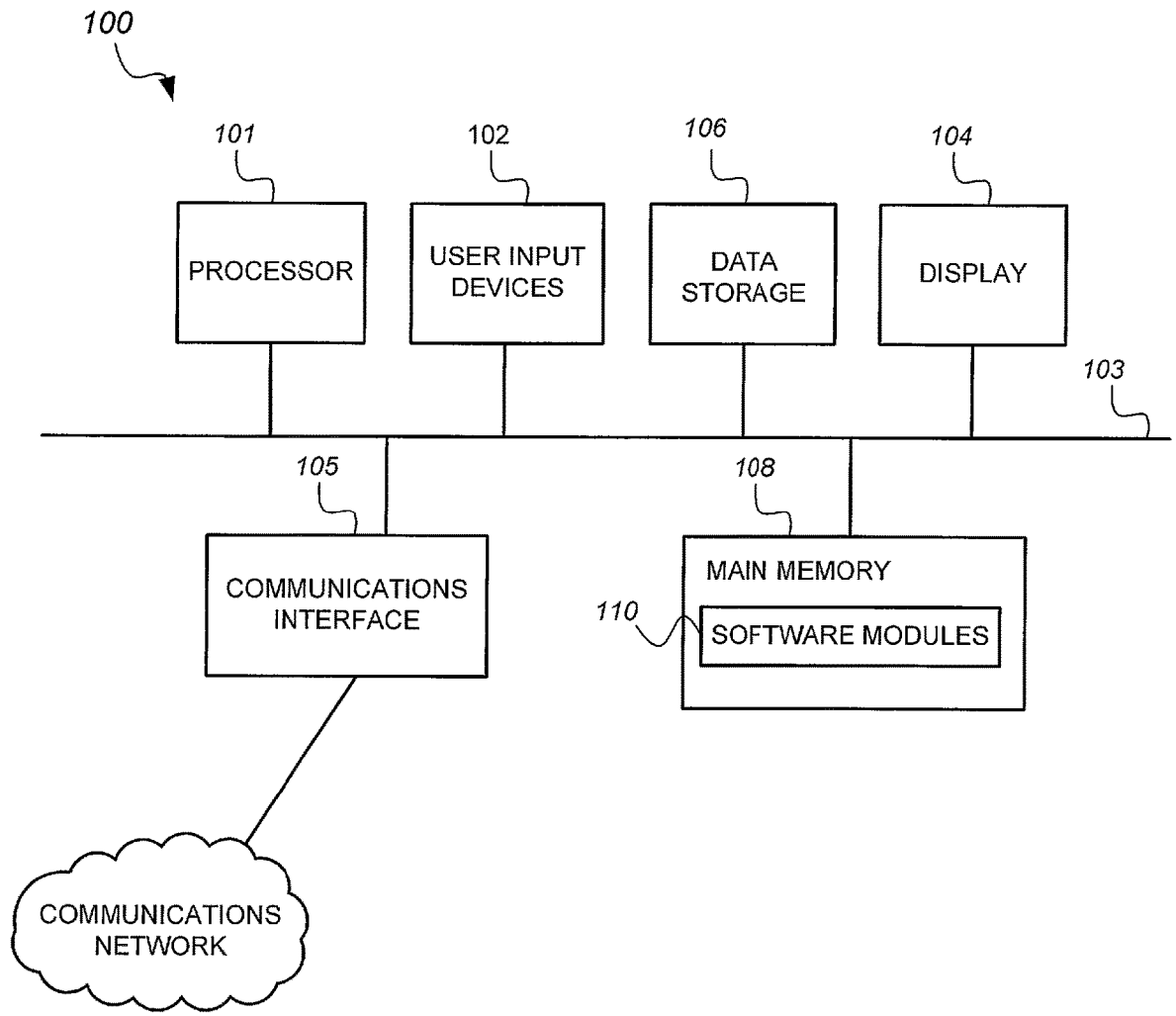
FIG. 6 shows a logical diagram of a mobile device in accordance with an embodiment of the present invention.

FIG. 6 shows a logical diagram of a mobile device 100 in accordance with an embodiment of the present invention. The mobile device 100 may have fewer or more components to meet the needs of a particular application. The mobile device 100 may include one or more processors 101, such as an ARM processor. The mobile device 100 may have one or more buses 103 coupling its various components. The mobile device 100 may include one or more user input devices 102 (e.g., microphone, physical buttons), one or more data storage devices 106 (e.g., solid state drive or other non-volatile memory), a touch screen display 104, a communications interface 105 (e.g., network adapter, cellular interface), and a main memory 108 (e.g., random access memory).

The mobile device 100 is a particular machine as programmed with one or more software modules 110, comprising instructions stored non-transitory in the main memory 108 for execution by the processor 101 to cause the mobile device 100 to perform corresponding programmed steps. An article of manufacture may be embodied as computer-readable storage medium including instructions that when executed by the processor 101 cause the mobile device 100 to be operable to perform the functions of the one or more software modules 110. The software modules 110 may comprise a mobile operating system, dynamic taint tracker, apps, etc.

Mobile devices and methods for dynamic taint tracking have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method for dynamically tracking a taint on a mobile device, the method comprising:
translating an opcode of an app into a control-flow graph (CFG);
inserting, in a block of the CFG, a first taint virtual instruction that corresponds to a first virtual instruction of a plurality of virtual instructions of the CFG, the first taint virtual instruction including a first taint operand that corresponds to a first operand of the first virtual instruction, a second taint operand that corresponds to a second operand of the first virtual instruction, and a first taint output that corresponds to a first output of the first virtual instruction;
allocating registers for the first taint virtual instruction and the plurality of virtual instructions;
after allocating registers for the first taint virtual instruction and the plurality of virtual instructions, converting the first taint virtual instruction and the plurality of virtual instructions into a native code;
executing the native code; and
tracking the taint through the app at runtime to detect data leakage.

2. The method of claim 1, wherein the data leakage comprises transmitting out of the mobile device sensitive data marked with the taint.

3. The method of claim 1, wherein the first taint virtual instruction is inserted in the block of the CFG after the CFG has been optimized.

4. The method of claim 1, wherein the opcode comprises a Dalvik opcode of the app.

5. The method of claim 1, further comprising:
before allocating registers for the first taint virtual instruction and the plurality of virtual instructions, inserting, in the block of the CFG, a second taint virtual instruction that corresponds to a second virtual instruction of the plurality of virtual instructions, the second taint virtual instruction receiving the first taint output of the first taint virtual instruction as a third taint operand, the second virtual instruction receiving the first output of the first virtual instruction as a third operand, the second taint virtual instruction including a second taint output that corresponds to a second output of the second virtual instruction.

6. The method of claim 1, wherein tracking the taint through the app comprises:
marking a sensitive data with the taint; and
detecting the taint at a taint sink.

7. The method of claim 6, wherein the taint sink comprises a network communications output of the mobile device.

8. The method of claim 1, wherein the mobile device is a smartphone.

9. A mobile device comprising a processor and memory, the memory storing instructions that when executed by the processor cause the mobile device to:
translate an opcode of an app into a control-flow graph (CFG);
optimize the CFG;
insert a plurality of taint virtual instructions in the optimized CFG, each of the taint virtual instructions comprising a taint operand that corresponds to an operand of a corresponding virtual instruction of a plurality of virtual instructions of the optimized CFG and a taint output that corresponds to an output of the corresponding virtual instruction;
allocating registers for the plurality of taint virtual instructions and the plurality of virtual instructions of the optimized CFG;

after allocating the registers, convert the plurality of taint virtual instructions and the plurality of virtual instructions of the optimized CFG into native code;

execute the native code; and detect data leakage by the app at runtime in response to detecting tainted data at a taint sink.

10. The mobile device of claim 9, wherein the opcode comprises a Dalvik opcode.

11. The mobile device of claim 9, wherein the mobile device is a smartphone.

12. The mobile device of claim 9, wherein the data leakage includes attempting to transmit the tainted data out of the mobile device.

13. The mobile device of claim 9, wherein the taint sink comprises a network communications output of the mobile device.

14. The mobile device of claim 9, wherein the tainted data comprises a location data that identifies a location of the mobile device.

15. A computer-implemented method of dynamically tracking a taint on a mobile device, the method comprising:

adding, in a block of an optimized control-flow graph (CFG), a first taint virtual instruction that corresponds to a first virtual instruction of the optimized CFG, the first taint virtual instruction comprising a first taint input that corresponds to a first input of the first virtual instruction and a first taint output that corresponds to a first output of the first virtual instruction;

after allocating registers for the first taint virtual instruction and the first virtual instruction, converting the taint virtual instruction and the first virtual instruction into a native code;

executing the native code; and detecting data leakage by monitoring a taint sink for the taint during execution of the native code.

16. The method of claim 15, further comprising:

receiving an app in the mobile device;

translating an opcode of the app into the CFG; and optimizing the CFG into the optimized CFG.

17. The method of claim 16, wherein the opcode comprises a Dalvik opcode.

18. The method of claim 15, wherein the taint sink comprises a network communications output of the mobile device.

19. The method of claim 15, wherein the mobile device is a smart phone.

20. The method of claim 15, further comprising:

adding, in the block of the optimized CFG, a second taint virtual instruction that corresponds to a second virtual instruction of the optimized CFG, the second taint virtual instruction comprising a second taint input that receives the first taint output of the first taint virtual instruction, the second taint virtual instruction further comprising a second taint output that corresponds to a second output of the second virtual instruction, the second virtual instruction comprising a second input that receives the second output of the first virtual instruction.

* * * * *